Nov. 29, 1938.  A. L. WARNER  2,138,264
WORK HOLDER FOR MOWER SECTIONS
Filed Oct. 5, 1936 2 Sheets-Sheet 2
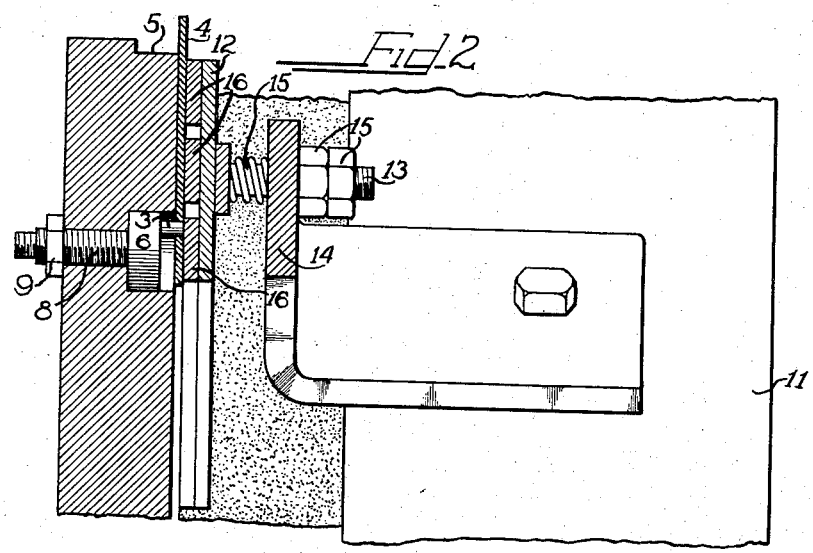
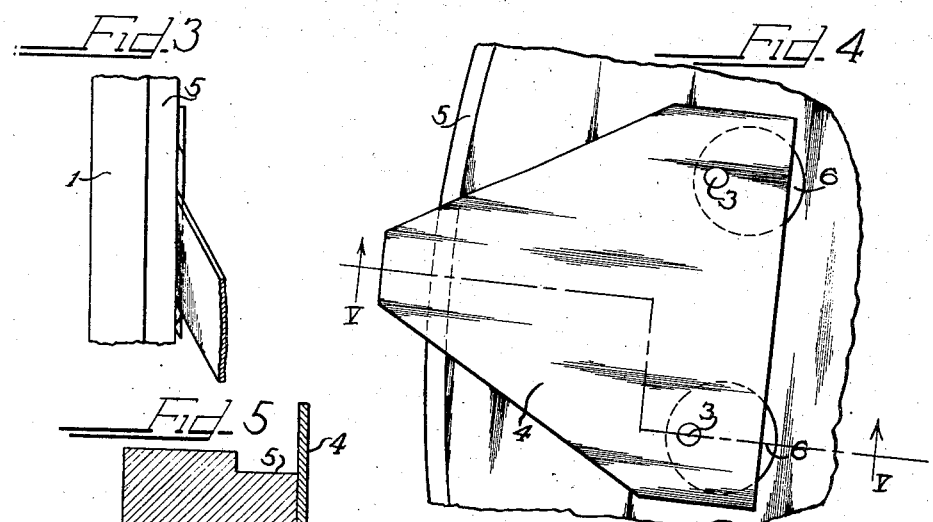
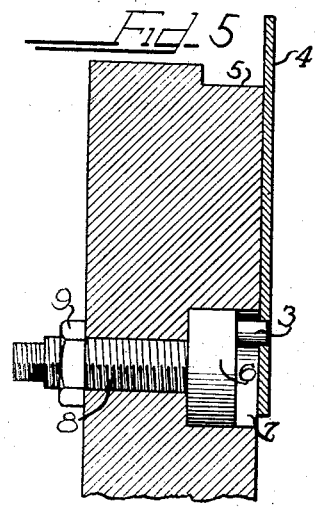
Inventor
ARTHUR L. WARNER Patented Nov. 29, 1938

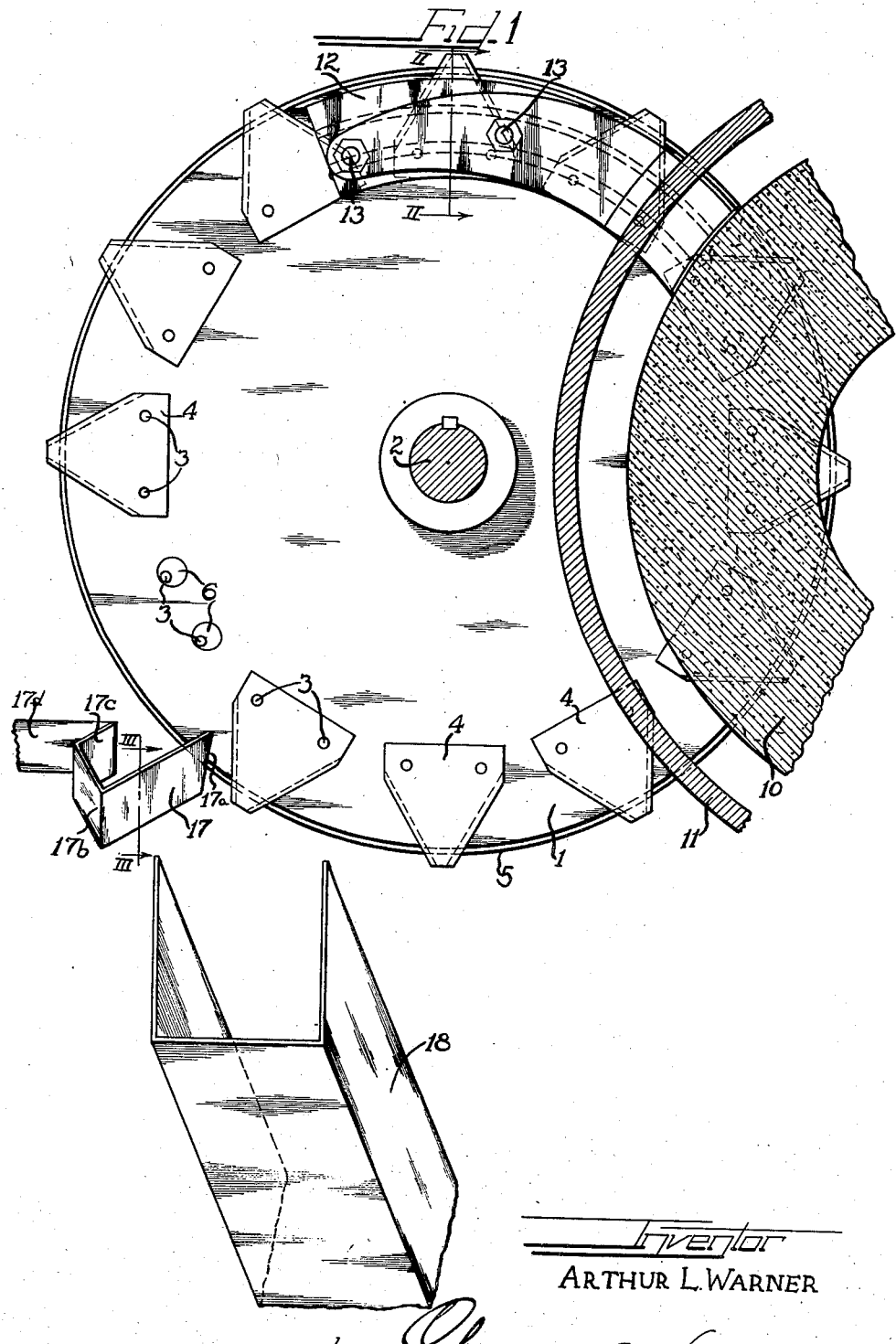

2,138,264

UNITED STATES PATENT OFFICE 2,138,264

WORK HOLDER FOR MOWER SECTIONS

Arthur L. Warner, Carpentersville, Ill., assignor to Illinois Iron & Bolt Company, Carpentersville, Ill., a corporation of Illinois Application October 5, 1936, Serial No. 103,993

6 Claims. (Cl. 51—237)

This invention relates to a work holder for mower sections and is a continuation in part of my co-pending application Serial No. 736,534, filed July 23, 1934.

The invention concerns itself with a rotary disk-like member carrying pairs of pins in circumferentially spaced relation upon which the mower sections can be readily placed by the attendant during the operation of the machine embodying the same.

It is a feature of the invention that the mower sections are not clamped or secured upon the work holder, but are merely retained by the pins, so that they can be easily kicked off by a kick-off device positioned at a suitable point adjacent the periphery thereof.

In its rotation, the work holder is designed to bring the exposed flat faces of the mower sections into operative relation with a grinding element for smoothing the flat faces thereof. A yieldable guard is preferably provided adjacent the grinding element under which the mower sections pass as they approach the grinding element. The guard will firmly position the mower sections against the work holder so that they will be properly aligned with the grinding element.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is an elevational view of a work holder embodying this invention and shown in its relation to a grinding element, a part only of which is shown in section.

Figure 2 is an enlarged sectional view taken substantially upon the line II—II of Figure 1, looking in the direction of the arrows.

Figure 3 is a fragmentary part sectional and part elevational view taken substantially upon the line III—III of Figure 1.

Figure 4 is an enlarged fragmentary plan view illustrating the pins mounted upon adjustable eccentrics.

Figure 5 is a fragmentary sectional view taken substantially upon the line V—V of Figure 4.

As illustrative of this invention, there is shown in the drawings, a rotary disk-like member 1 keyed upon a driving shaft 2. Pairs of pins or pegs 3 extend from the front face of said disk-like member, each pair of pins being designed for fitting in the usual rivet holes of a mower section 4. These pairs of pins 3 are suitably spaced in circular formation at a suitable distance within the periphery of the disk which may be provided with a rabbet 5 for the proper positioning of a kick-off device, as will later more fully appear.

In the event that the rivet holes in different mower sections are differently spaced requiring the pins to be more narrowly or more widely spaced, these pins may be mounted upon adjustable eccentrics 6, as shown in Figures 1, 4 and 5. Such eccentrics 6 are designed to be mounted in circular holes 7 formed in the disk 1, and they are preferably provided with threaded shafts or rods 8 extending through the disk for the reception of nuts 9 whereby the eccentrics may be firmly drawn against the disk in adjusted positions.

The flat backs of the mower sections retained on the pins 3 are designed to be carried into operative relation with a lateral grinding face of a rotary grinding element 10 partially enclosed in a housing 11. From the periphery of the grinding element, there extends an arcuate guard 12 supported in a suitable manner by means of bolts 13 which extend through a supporting bracket 14 secured to the cover 11 of the grinding element. Springs 15 surround the bolts 13 between the guard 12 and bracket 14 and are effective for yieldingly urging the guard toward the disk 1. This movement is, however, restrained by the nuts 15 on the bolts that bear against the bracket. The inner face of the guard 12 preferably comprises a plurality of spaced arcuate strips 16 welded or secured to the guard 12.

As the mower sections pass under this guard, they will be yieldingly pressed against the face of the disk 1, for it will be appreciated that these sections are rapidly placed upon the pins during the rotation of the disk or work holder and may not rest solidly against the face thereof.

Thus, the mower sections are firmly positioned against the face of the work holder when they come into contact with the grinding element for smoothing the back faces thereof. As the work holder revolves and the smoothed or ground mower sections leave the grinding element and reach the kick-off device 17, they are kicked off and fall into a chute 18. The kick-off device 17 preferably consists of a metal strip having a bevelled end 17a that extends over the rabbeted edge of the disk in such position as to intercept the mower sections and lift the same from the pins. It will be noted that the bevelled end 17 is fairly pointed and lies close to the face of the disk 1 with the result that the adjacent bevelled edge of a section 4, as indicated by dotted lines, can ride over such pointed end and be elevated. When the sections are kicked from the pins, they will drop by gravity into the chute 18 and be conveyed to a receptacle, not shown.

The bevelled end 17a is formed upon the inner end of a metal strip which is bent at a right angle beyond the disk, as indicated at 17b. The strip extends at the right angle for a short distance, when it is bent forwardly at an obtuse angle, as indicated at 17c. The obtuse portion 17c is then bent outwardly at an acute angle to provide an attaching flange 17d which may be secured to any suitable support, not shown. The angular formation of the kick-off device gives it a certain amount of flexibility without any tendency to cause a permanent distortion thereof.

The manner of supporting the chute 18 has not been illustrated, since it is clearly within the realm of any mechanic to properly secure the same in position.

It will be appreciated that the work holder involving this invention provides a continuous operation, upon which the sections can be rapidly mounted by an attendant during the rotation thereof, and no clamping means are required to hold the sections in position. It will further be appreciated that by eliminating the clamping means heretofore used, an attendant has more leeway in applying the sections to the work holder, for they may be applied at any point between the kick-off device 17 and the guard 12 upon the left hand side of the work holder. When clamps are used, they are opened at a predetermined point for receiving the work, and it is necessary to insert the work at that point or else there will be a vacancy. This objection is overcome by the work holder involving this invention.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a grinding machine for grinding mower elements having spaced apertures, a grinding element having a flat side face for grinding said elements, a rotary disk having a flat surface upon one side in opposed relation to the flat side of said grinding element, a circular series of pins arranged in pairs upon the flat surface of said disk, each pair of pins adapted for fitting the holes in a mower element for supporting the same, means adjacent said grinding element for pressing said mower elements against said disk, and a kick off device having means for engaging under said mower elements at a predetermined point for removing the same from said disk after the grinding operation.

2. In a grinding machine for grinding mower sections with spaced apertures, a grinding element having a flat side grinding face, a rotary work holder having a flat side face in opposed relation to the flat side of said grinding element, a circular series of pins arranged in pairs upon the flat side face of said work holder, each pair of pins being adapted to fit the holes in a mower section, and a kick off device positioned adjacent said disk and having a portion overlapping said disk and engageable under a mower section for removing the same from said work holder after the grinding operation.

3. In a grinding machine for grinding members having spaced apertures, a grinding element having a flat side grinding face, a work holder having a flat surface in opposed relation to said flat side grinding face, a circular series of pins arranged in pairs upon the flat surface of said work holder, adapted for fitting the holes in said members and adjustable eccentric means in said work holder supporting said pins.

4. In a grinding machine for grinding members having spaced apertures, a grinding element, a work holder having a flat side face for presenting the members in operative relation with said grinding element, said side face being provided with circular recesses, disks rotatably mounted in said recesses, pins eccentrically mounted upon said disks and adapted for fitting the apertures in said members.

5. In a grinding machine for grinding members having spaced apertures, a grinding element, and a work holder having a flat surface upon one side with means thereon for retaining said members for presenting the same in operative relation to said grinding element, said means comprising a pair of pins projecting from the flat surface of said work holder, each pin being adjustable in an arc for fitting in the aperture of a member.

6. In a grinding machine for grinding mower sections having spaced apertures, a grinding element, a rotary work holder having a flat side with means thereon for retaining a plurality of said mower sections and presenting them successively in operative relation to said grinding element, said means comprising a circular series of pins arranged in spaced pairs, and each pair being constructed and arranged for fitting the holes in one mower section, said pins being provided with means for adjusting the spacing of said pairs.

ARTHUR L. WARNER.